(12) United States Patent
Radostev et al.

(10) Patent No.: US 10,467,345 B2
(45) Date of Patent: Nov. 5, 2019

(54) FRAMEWORK FOR LANGUAGE UNDERSTANDING SYSTEMS THAT MAXIMIZES REUSE THROUGH CHAINED RESOLVERS

(71) Applicant: Microsoft Technology Licensing, LLC, Redmond, WA (US)

(72) Inventors: Vasiliy Radostev, Seattle, WA (US); Ruhi Sarikaya, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 366 days.

(21) Appl. No.: 15/252,000

(22) Filed: Aug. 30, 2016

(65) Prior Publication Data

US 2018/0060300 A1 Mar. 1, 2018

(51) Int. Cl.
*G06F 17/27* (2006.01)
*G06F 16/33* (2019.01)

(52) U.S. Cl.
CPC ........ *G06F 17/279* (2013.01); *G06F 16/3344* (2019.01)

(58) Field of Classification Search
None
See application file for complete search history.

(56) References Cited

U.S. PATENT DOCUMENTS

| | | | |
|---|---|---|---|
| 8,670,979 B2 | 3/2014 | Gruber et al. | |
| 8,943,094 B2* | 1/2015 | Brown | G06F 17/273 707/771 |
| 9,275,641 B1 | 3/2016 | Gelfenbeyn et al. | |
| 9,372,924 B2* | 6/2016 | Bostick | G06F 17/2785 |
| 2003/0088544 A1* | 5/2003 | Kan | G06F 16/9535 |
| 2003/0126120 A1* | 7/2003 | Faybishenko | G06F 16/9535 |
| 2003/0158839 A1* | 8/2003 | Faybishenko | G06F 16/9535 |
| 2011/0071819 A1* | 3/2011 | Miller | G06F 17/273 704/9 |
| 2013/0152092 A1 | 6/2013 | Yadgar | |
| 2013/0332145 A1* | 12/2013 | Bostick | G06F 17/2785 704/9 |
| 2015/0179168 A1 | 6/2015 | Hakkani-Tur et al. | |
| 2015/0286747 A1 | 10/2015 | Anastasakos et al. | |
| 2016/0196499 A1 | 7/2016 | Khan et al. | |
| 2018/0060300 A1* | 3/2018 | Radostev | G06F 16/3344 |

OTHER PUBLICATIONS

Allen, et al., "An Architecture for a Generic Dialogue Shell", In Journal of Natural Language Engineering, vol. 6, Nos. 3&4, Sep. 2000, pp. 1-23.

(Continued)

*Primary Examiner* — Marcus T Riley
(74) *Attorney, Agent, or Firm* — Merchant & Gould P.C.

(57) ABSTRACT

Aspects herein provide third-party application authors with a resolver chaining platform that simplifies the task of creating customized resolvers to gather information from user input while also allowing those authors to chain their custom resolvers with generic resolvers provided by the platform's host and that relate to commonly used parameter types. In particular, the present disclosure provides a method and system for authoring and using these resolver chains made up of a combination of custom and generic resolvers.

20 Claims, 9 Drawing Sheets

(56) References Cited

OTHER PUBLICATIONS

Lee, Gary Geunbae, "Siri, Watson and Natural Language Processing", Retrieved on: Jul. 12, 2016 Available at: https://www.uni-ulm.de/fileadmin/website_uni_ulm/allgemein/2015_iwsds/isoft_seminar_2014.pdf, 168 pgs.
Botla, Purushotham, "Designing Personal Assistant Software for Task Management using Semantic Web Technologies and Knowledge Databases", In Doctoral dissertation of Massachusetts Institute of Technology, Jun. 2013, 112 pages.
Williams, et al., "End-to-end LSTM-based dialog control optimized with supervised and reinforcement learning", In Journal of Computing Research Repository, Jun. 2016, 10 pages.
Luperfoy, et al., "An Architecture for Dialogue Management, Context Tracking, and Pragmatic Adaptation in Spoken Dialogue Systems", In Proceedings of the 36th Annual Meeting of the Association for Computational Linguistics and 17th International Conference on Computational Linguistics, Aug. 10, 1998, pp. 794-801.
Sullivan, Danny, "How Google Now, Siri & Cortana Predict What You Want", Published on: Sep. 18, 2015 Available at: http://searchengineland.com/how-google-now-siri-cortana-predict-what-you-want-229799, 6 pgs.
Djenidi, et al., "Generic Pipelined Multi-Agents Architecture for Multimedia Multimodal Software environment", In Journal of Object Technology, vol. 3, No. 8, Sep. 2004, pp. 147-169.

\* cited by examiner

FRAMEWORK FOR LANGUAGE UNDERSTANDING SYSTEMS THAT MAXIMIZES REUSE THROUGH CHAINED RESOLVERS

BACKGROUND

Language understanding systems allow users to communicate with a computer or network and accomplish various tasks by providing natural language input. Such systems typically analyze the elements of the received by natural language input (e.g., text or speech) to determine a user's intent, determine the correct task to accomplish that intent, and to gather the necessary parameters to fulfill that task. Tasks may include activating and providing information to an application, performing a query, ordering goods or services from a provider, or scheduling events on a calendar. Typically, each third-party application designer who wishes to interface with language understanding systems must write an application interface to handle all aspects of the user's communication. Frequently, however, this results in multiple third parties duplicating significant portions of these interfaces when solving for similar circumstances. It is with respect to these and other general considerations that aspects of the present disclosure were developed. Also, while specific problems and circumstances are discussed herein, it should be understood that the inventions discussed herein are not limited to solving those only those problems or working in those circumstances.

SUMMARY

In general terms, this disclosure is directed to a platform to allow third-party application experience designers to write detailed resolvers for their tasks without having to rewrite commonly used aspects. In particular, the present disclosure provides third-party application experience designers a way to use generic resolvers, provided by the platform provider, for the majority of parameter gathering, and writing specific resolution and dialog code for the aspects of the resolver that are particular to a task or application's specific needs.

In one aspect, the present disclosure is directed to a computer system that executes instructions performing a method of chaining together resolvers to aid in understanding natural language expressions from users. These natural language expressions express intents by the user that may be carried out by tasks on the same computer system or a third-party computer system. These tasks rely on parameters extracted from the natural language expression by the resolvers discussed herein. The computer system may receive from an application developer a designation of one or more generic resolvers. These generic resolvers may relate to general forms of parameters, such as time or location. The system also receives from the application developer a custom resolver, which may contain the list of parameters to be resolved by the resolver chain. The system then combines the generic and custom resolvers together so that the combination may operate to extract at least one parameter from the natural language expression. Finally, the system may store the resolver chain for future use by a natural language understanding system.

In yet another aspect, the present disclosure is directed to a method for using a resolver chain to extract at least one parameter from a natural language expression related to a task. The computer system performing the method may first receive from a user a natural language expression related to a task. It may then retrieve at least one resolver chain related to the task, where the resolver chain comprises at least one generic resolver and at least one custom resolver. The computer system may then evaluate the natural language expression using the resolver chain, first parsing the natural language expression into at least one subunit, then applying at least one generic resolver and at least one custom resolver from the resolver chain to extract at least one parameter from the at least one subunit. Finally, the system may pass the extracted parameters to the task.

DETAILED DESCRIPTION

Figure 1:
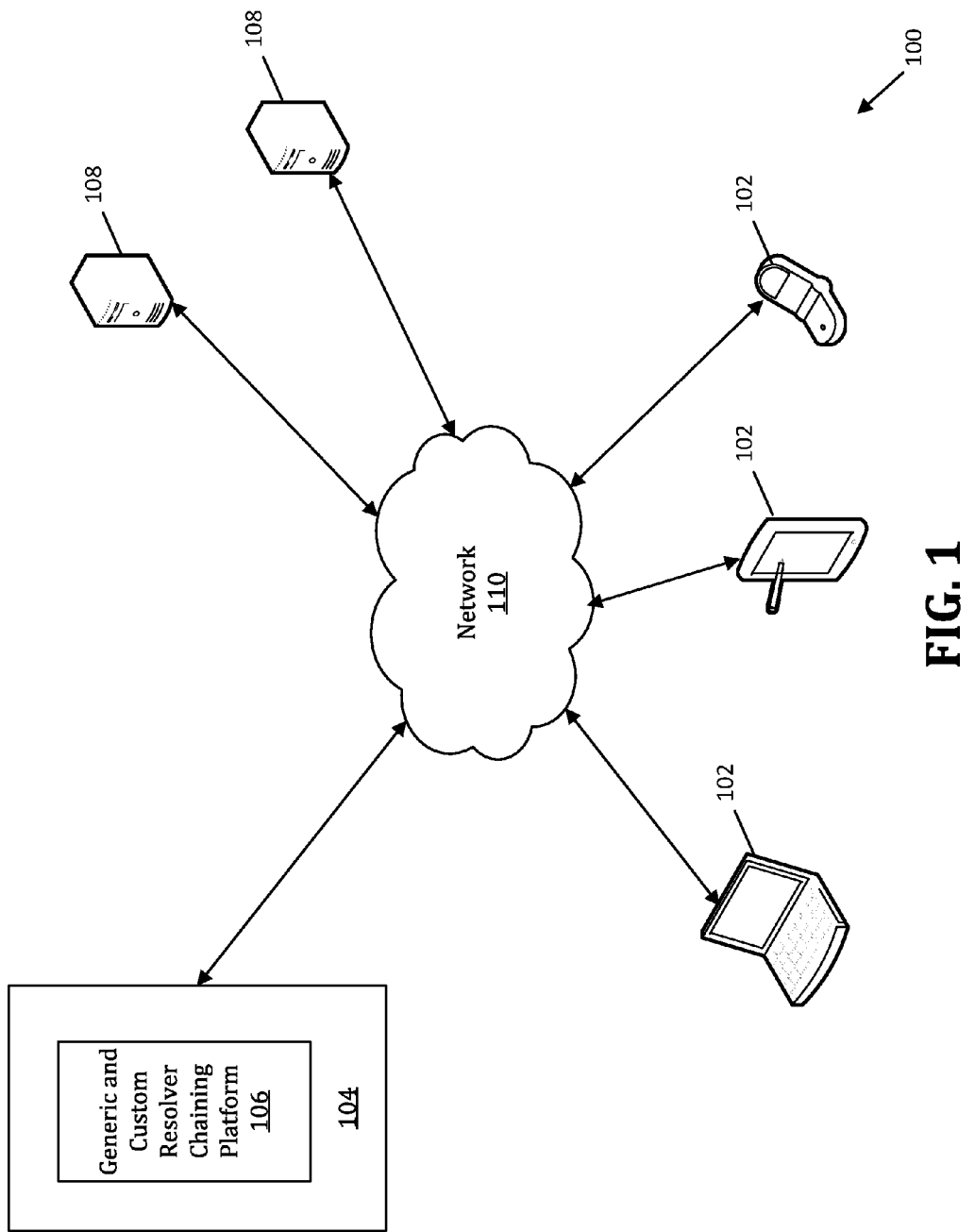
FIG. 1 illustrates a schematic block diagram of an example network usable for authoring third-party experiences.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Conversational understanding ("CU") systems assist users in performing various tasks by conducting a conversation with the user, using, for example, a spoken dialogue system, in which one or more question and answer turns may be involved. Conversational Understanding systems may be used to implement intelligent digital assistant applications, such as the CORTANA digital assistant application offered by Microsoft of Redmond, Wash. While an example of a specific digital assistant application is provided herein, one of skill in the art will appreciate that other types of digital assistants and/or natural language understanding systems may be practiced with the various aspects disclosed herein. Conversational understanding systems use language understanding ("LU") models to identify spoken words and tag words of importance or relevance to a particular task. Tasks may be defined as the execution of a transactional action or providing information as requested by the user. Such tasks may be, for example, performance of an Internet query, display of results, execution of an application, procurement of third-party services, etc. Tasks may be defined in terms of parameters, wherein parameters are containers that specify the entities that are collected and the semantic meaning of those entities within this task. Entities are representations of knowledge or understanding, for example, a preference for "delivery" or "take-out" is an entity. Additionally, entities may be objects, such as a specific address or a restaurant. The task of reserving a taxi may require the fulfillment of parameters such as the start location, the time of pickup, and the number of passengers prior to execution of that task. As another example, the task of making a call using a phone application may require the fulfillment of parameters such as the name of the business or person to whom the call is directed or a phone number. As yet another example, the task of reserving a hotel may require the fulfillment of parameters such as the name of the city, the dates of the reservation, and an identification of the particular hotel. Tasks may further include optional parameters. For example, in the taxi example, optional parameters may be an identification of the destination location or the type of car desired. Referring to the hotel example, optional parameters may be the star rating of a hotel or proximity to a certain area of the selected city. Such optional parameters are not required for task execution, but may assist the application responsible for executing the task to refine further the desired task to be executed.

The conversation between the user and the CU system, which uses one or more LU models, is intended to obtain, from the user, the information that is necessary to fulfill those required parameters (and in some aspects, optional parameters) in order to execute the desired task. Further, each conversation may be broken into subunits for analysis and response within the CU system. Each subunit may be analyzed within one or more resolver chains, which resolve the input into the relevant parameters for the task. The resolver chain may operate by evaluating the natural language expression or a subunit of the natural language expression and returning relevant parameters to the defined task. Another role of the resolver chain is to ensure that all necessary parameters are properly fulfilled by the natural language expression and to respond to the user if such information is lacking or ambiguous. Yet another role of the resolver is to recognize when the requested parameters exist, but are not supported by final action—such as the user seeking to make reservations at a restaurant that does not accept reservations. Finally, the resolver chain confirms with the user that the extracted parameters, including any implicit assumptions made by the resolver, are correct. To accomplish this, the CU system maintains a record of the information obtained during the conversation with the user as it relates to the defined parameters necessary (and in some aspects, optional) to execute the task. Additionally, CU systems may infer information that is outside the conversation, for example, inferring the user's location or language requirements. In some aspects, the CU system may provide, to the user, the obtained information as a way of verifying the accuracy of the obtained information. For example, the CU system may display the obtained information to the user or may verbally identify the obtained information providing the user with a confirmation of the CU system's understanding of the task execution and the corresponding parameters obtained. In aspects, CU systems may revise information obtained during the user conversation to address speech recognition or comprehension errors, language understanding errors, parameter resolution errors, or as requested by a user.

Additionally, the CU system, using the resolver chain, may ask, via a voice or a text prompt, the user to provide further information that is necessary for task execution. For example, the resolver chain may have pre-defined or auto-generated prompts that elicit, from the user, further information or clarification to fulfill the required parameters necessary for task execution.

Still further, during the conversation, the CU system may, through use of resolver chains, provide the user with matching or suggested valid options from which to select for fulfillment of parameters prior to execution of the task. The CU system may provide, to the user, the information obtained during the conversation by, for example, displaying the gathered information on a display of the device or by, for example, reading aloud the gathered information. The resolver chain may further ask the user to confirm the accuracy of the provided information as a final step prior to task execution. At this point in the conversation, the user may, for example, confirm or edit the information or cancel execution of the task altogether. In an example, the user may confirm or edit the information by voice or gesture such as typing, touch, or movement of the device. Based on a confirmation response received from the user, the CU system may execute the identified task. Based on an edit information response received from the user, the CU system may repeat the conversation or seek selected information to be edited. Based on a cancellation response received from the user, the CU system may terminate the conversation and task execution process entirely.

Within the CU system, a resolver chain may be defined as a combination of custom resolvers, written by the third-party application author, and generic resolvers, written by the platform developer, host, or other third-party application developers. By dividing the resolver chain into custom and generic resolvers, the system allows third-party application authors to leverage the work of the platform developer, host, or other developers such that the third parties may write a minority of the resolver logic. This combination simultaneously gains the benefits, among others, of a robust, well-tested system while providing enough specific logic to customize the application and to gather the specific parameters necessary for the task and also making the application feel specific to that task.

Aspects disclosed herein provide a platform that automates and simplifies the task definition process while also providing the ability to leverage pre-existing language understanding models and canonicalization and resolution modules that are provided by the operating system or a cloud-based service on which the CU system resides or as provided by other third parties. The systems and methods disclosed herein provide a tool that can be used to create an interface between the third-party application and the CU system. Although reference is made to a third-party application and third-party application authors, the aspects provided herein may extend to any application or application author. Furthermore, because CU systems are complex and hard to design, the systems and methods disclosed herein provide the ability for third-party applications to make use of existing CU systems and models. Third-party application authors can therefore use the user interface-authoring platform to efficiently and more simply define tasks and leverage pre-existing language understanding models to identify those defined tasks.

FIG. 1 illustrates a schematic block diagram of an example network 100 usable for authoring third-party experiences using a user interface platform. The network 100 includes one or more client devices 102, a server 104 hosting a generic and custom resolver chaining platform 106, and a database 108 storing, among others, language understanding models and canonicalization and resolution modules. In this example aspect, the client devices 102, the server 104, and the database 108 are connected via a data communication network 110, such as the Internet.

Aspects described herein are directed to providing a generic and custom resolver chaining platform 106. The custom resolver chaining platform 106 is a tool used to receive resolver selections and definitions to chain resolvers together for a given task. The task may be defined and/or executed by a third-party application. In some aspects, the custom resolver chaining platform 106 operates remotely on the server, accessible by one or more client devices 102 via the data communication network 110. In other aspects, the custom resolver chaining platform 106 operates locally on the one or more client devices 102.

As will be described in further detail herein, the custom resolver chaining platform 106 is a tool designed to provide third-party application authors with the ability to define resolver chains that are able to translate natural language expressions into one or more parameters for specific tasks to be performed by an application. In one example, the custom resolver chaining platform 106 allows the third-party application authors to define the custom resolvers, along with their related sub-dialogs, associated parameters, and verification methods related to an application task.

Tasks are defined in terms of the one or more required or optional parameters used to complete the task. When defining a task, the application author may specify validation conditions, which define the one or more valid conditions that must exist among one or more parameters for task execution. Additionally, the third-party application author may select, from a database, one or more language understanding ("LU") models that extract, from a natural language expression (NLE), the information required to identify the appropriate task and to identify corresponding parameters. As used herein, a NLE may refer to a human language expression. That is, a NLE is an expression that is provided as if the expression was provided as it would be in normal conversation. A NLE may be provided in speech or in text. The LU models are used to annotate or analyze spoken or text input and may be directed to a specified domain. For example, an LU model may be specific to identifying utterances (e.g., speech or text input) relating to the task of booking restaurant reservations in a restaurant domain. Such an LU model may be used to identify words or phrases to determine a user's intent as it relates to the particular domain and may also be used to fill the parameters of the task. For example, a particular LU model may be used for the task of booking restaurant reservations. Such an LU model could be applied to the spoken phrase "Is there availability for four people at Andy's Mexican Restaurant tonight at 6:30?" to identify the task of making a restaurant reservation and to identify parameters such as the particular restaurant at which reservations are desired [Andy's Mexican Restaurant], the number of people [four], and the time [6:30 PM] which may be required in order to execute the task.

When defining the task, the third-party application author may be able to select one or more preexisting LU models. To the extent that an LU model does not already exist in the database, the third-party application author may create one or more new LU models. Furthermore, the third-party application author may select, from the database, one or more canonicalization or resolution modules that transform user input into a standardized format. To the extent that a canonicalization or resolution module does not already exist in the database, the third-party application author may create such modules.

In further aspects, a third-party application author may select one more standard parameters and/or entities for their tasks that may be resolved using standard resolvers. If the standard resolvers do not provide an exact match for the task, the standard resolvers may be chained such that initial resolution may be performed using as standard resolver and then refined using a custom resolver defined by the third-party application author. Alternatively, the third-party application author may forego using a chain of resolvers and define a customer resolver that takes input from a standard LU model. In still further aspects, the third party-application author may determine that a standard LU model is unsuitable for a particular task and may create a custom LU model with one or more custom resolvers. As such, the various aspects provided herein provide third-party application authors with the flexibility to define resolvers according to their specific needs.

Client device 102 may be any computing device, such as, for example, a cell phone, a personal digital assistant, a laptop, a desktop, or a tablet PC. The client device 102 hosts the intelligent digital assistant application, as described herein, or is the platform from which a third-party application author interfaces with generic and custom resolver chaining platform 106. Still further, the client device 102 stores one or more applications that can be executed thereon using the intelligent digital assistant application. Such applications may refer to, for example, applications that are provided with the device such as a phone application, an Internet browser application, an email application, a weather application, a note taking application, a text messaging application, a calendar application, a camera application, a map application, etc. Other third-party applications may also be installed on the client device 102, such as, for example, a taxi cab reservation application, a hotel reservation application, a social media application, a gaming application, etc. Accordingly, a third-party application author may create, on the client device 102, one or more tasks that execute a particular third-party application installed on the client device 102.

Figure 2:
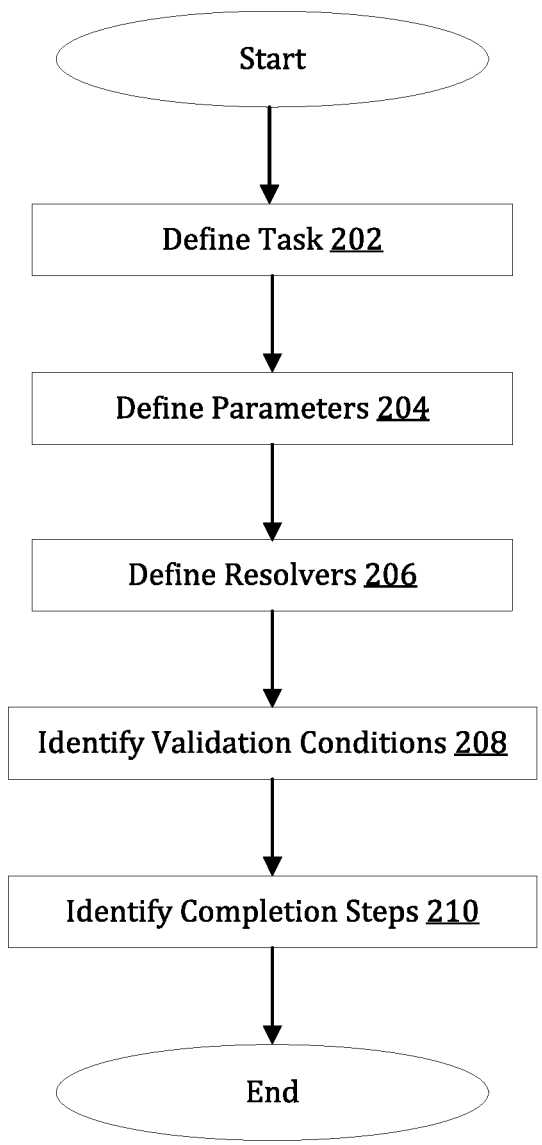
FIG. 2 illustrates an example method for specifying a task.

FIG. 2 illustrates an example method 200 for specifying a task. As described herein, a third-party application designer, among other actions, specify tasks and corresponding parameters as well as select appropriate LU models used to analyze NLEs to determine a user's intent as it relates to the defined task. Specification of a task includes combining the tagged user input as user input with other parameters that have been collected in order to canonicalize and resolve the entity representing that particular parameter. As an example, in the taxi ordering task example, a resolver may combine a previously-collected parameter representing the user's location together with tagged user input representing the type of taxi desired by the user to determine whether the type of taxi requested by the user is available. If such a taxi type is available, the resolver may provide a product identification. If, alternatively, no such taxi type is available, the resolver may provide an error message indicating that the particular type of cab requested is not available in that location. In another example, such as a phone calling experience, the system may use a previously-collected parameter indicating which contact to call, together with tagged user input representing the phone number type (for example, work, home, or cellular) in order to identify the actual phone number to dial.

It is understood that the author may create tasks, select LU models, intents, parameters, resolvers, validation conditions, etc., using a natural language task completion platform. The natural language task completion platform may provide the author with suggestions, either in response to a selection provided by the author or in response to an understanding of the author's goal in view of the task. For example, the author may input a query and the authoring system may, in response, provide suggestions for possible intents, slot tags, parameters, resolvers, validation conditions, etc.

Furthermore, although illustrations and examples provided herein describe a particular implementation using the platform 106, aspects of the present disclosure may also be implemented using an Integrated Development Environment (IDE) such as, for example, Visual Studio offered by Microsoft of Redmond, Wash. One of skill in the art will appreciate that other IDEs may be used without departing from the spirit of this disclosure. Such an implementation using an IDE allows authors to provide task specifications using a text-like developer tool that is not web-portal based. Such an IDE may also provide support for discovery, auto-completion, suggestions, and syntax correction of task definition files.

Flow begins at task definition operation 202. At the task definition operation 202, the third-party application author (hereinafter "author") defines a task. In particular, defining a task may involve one or more of identifying the task name, providing an associated description of the task, and/or associating the task with a specific application or function. In an example, the author may identify the name of a task that the particular application executes. For example, a task may be identified as "BookTaxi" for a taxi service application. In other examples, the task may be defined as "FindScores" for a sports application. In the task definition operation 202, author may also select at least one LU domain or category associated with the task.

In the process of defining a task, the author may select, from the database, one or more additional trigger domains associated with the identified task. Generally, a trigger domain is considered to be a collection of trigger intents that include the slot tags for tagging the information necessary to execute the task. In an example, an "alarm" trigger domain may comprise trigger intents of various actions that could be taken such as, for example, "add_alarm," "modify_alarm," "query_alarm," and "delete_alarm" wherein the corresponding slot tags to fulfill those trigger intents might be, for example, "alarm_name," "alarm_time," etc. Accordingly, it is understood that in operation 202, the LU domain selected has associated therewith one or more trigger intents and corresponding slot tags. These slot tags will later be associated with selected parameters and fulfilled by the use of resolver chains.

After defining the task, flow may proceed to the define parameters operation 204. In the define parameters operation 204, parameters are identified and defined. As described herein, tasks may be described by one or more parameters that are fulfilled prior to task execution by execution of the resolver chain. Parameters specify the task and the pieces of information that need to be collected by the resolver chain before the task is executed. Parameters relate to, and provide information for, the task defined in operation 202. A parameter may correspond to information that must be collected or processed by the CU system before the task can be executed. For example, a parameter may correspond to information such as the start location of the "BookTaxi" task. The value of each parameter is either collected by the resolver chain or it is inferred by the system. For example, if a parameter requires the person's location, the person may either provide that information or the CU system may use the device's GPS system to determine the person's location. This default behavior may be written by the third party application developer. Alternatively or additionally, if time is a parameter, the person may provide the time, where it is extracted by the resolver chain, or the system may infer that if no time is specified, the current time or some other time is used.

Referring back to the define parameters operation 204, the parameter description may be a text string that provides further detail about the parameter. For example, in the taxi example, for the parameter name "end_location" the associated description may be "The destination location of the trip."

The parameter type may categorize the parameter. For example, the parameter type for the "end_location" parameter may be of type "Place." The type may be a predefined type that is understood by the CU system. Accordingly, by setting the type as "Place" the CU system may understand that the end_location parameter corresponds to latitude/longitudinal coordinates. It is understood that the parameter type may be either defined or selected from a list of parameter types by the author.

The one or more slot tags are used as inputs to resolve the parameter. In this example, the slot tags "absolute_location", "place_type", and "place_name" may be selected, each of which correspond to a particular type of location information tagged in user input utterances. For example, "One Microsoft Way" may be tagged as an "absolute_location," whereas "the Space Needle" may be tagged as a "place_name." Collectively, the set of slot values corresponding to the instances of "absolute_location", "place_type" and "place_name" will be used to resolve the user input into one or more place entities, which would form the possible values of the parameter end location.

As an alternative to the above parameter definition, a developer may instead choose an existing generic resolver, consider the parameters and slot tags received and resolved by said generic resolver, and then create a custom resolver that accepts these parameters as input and define parameters and slot tags as output from the custom resolver.

In the identify resolvers operation 206, for each parameter, author specifically identifies the resolver selected in the identify parameters operation 204. For example, the identify resolvers operation 206 may comprise identifying the name and relative path of the library in which the selected resolver resides as well as identification of the function name within the resolver library.

The author may also define a failure dialog act that provides a failure prompt to the user in the event that the parameter cannot be resolved. In an example, for a location-based parameter, the author may define a dialog act that provides a text string that recites, "I'm sorry, I cannot resolve the location right now."

Additionally, one or more dialog acts may be included in the resolver to define how the system obtains information for each parameter. In some embodiments, a dialog act may be defined as a prompt that is displayed or otherwise provided to a user and in other embodiments, a dialog act is defined differently. A dialog act may thus be defined as a prompt and/or a user experience/user interface. Referring back to FIG. 2, in the define resolvers operation 206, information gathering dialog acts may be, for example, a missing value dialog act, a disambiguation dialog act, a no results dialog act, a suggestions dialog act, a selection dialog act for prompting the user to select from among a small list of possible values, and a confirmation dialog act prompting the user to confirm the value of the parameter. The one or more dialog acts may be used to define the user interface implementation for obtaining such information related to each parameter from the user. In particular, the author may define one or more user interfaces that may be provided to a user to simply display information to the user or to obtain information for task execution. In the "BookTaxi" task example, a dialog act may be used to define a map user interface that could be displayed on the user's device showing the pick-up location in response to receiving information relating to the "destination_location" parameter. Still further, in the "BookTaxi" task example, another dialog act may be used to define an interactive map or a selectable list of nearby or potential locations on the user's device in response to receiving a pick-up location that could not be found or determined by the system.

The selected resolver chain for each parameter may be used to inform the CU system how to resolve or understand a detected keyword. In this example, a "PlaceResolver" may be selected, which informs the system that the provided parameter is associated with latitude and longitudinal coordinates. A place resolver may be an example of a generic resolver. In the "BookTaxi" task example, for a car preference parameter, the CU system extracts, from the natural language query, the user's car preference. Based on the provided resolver chain, the CU system determines or resolves the car preference into a car identification. In some examples, it is understood that the resolver chain may be a combination of resolvers, authored by both the experience author and the platform provider.

A missing value dialog act may be defined by the author that instructs the resolver to request, from the user, the parameter value if the value is not obtained from the query. For example, the missing value dialog act may be a prompt string such as, "Where would you like to go?" for the "end_location" parameter. The dialog act may also be used to specify the associated user experience, such as displaying, on the display of the device, the prompt string, or verbally providing the prompt to the user. The author may also use a dialog act to select or define a user interface to be displayed to the user and used to obtain such parameter information. In the "end_location" parameter example, the author may select a map user interface to display a selectable map that allows the user to simply select the destination location rather than providing it verbally or typing it in. In another example such as a "BookRestaurant" task having a "reservation_time" parameter, the author may select a user interface to display a selectable list of appropriate times from which the user may choose as the reservation time.

A disambiguation dialog act may be defined by the author that instructs the CU system, via the resolver, to ask the user to verify a particular value of a parameter in order to resolve ambiguities that may arise because the resolver obtained multiple potential values for a parameter. For example, in response to extracting two different locations from the natural language query, the CU system may display a listing of the obtained values alongside a prompt such as "Please select your destination location.". In other examples, the resolver may simply prompt the user to re-state the destination location without providing a selection. The author may also define a user interface dialog act that is displayed or otherwise provided to the user in response to receiving conflicting pieces of information. In an example, the author may define dialog act that displays, on the user's device, a listing of the conflicting pieces of information and requesting the user to select the correct information, or, if none of the displayed information is appropriate, requesting the user to manually or verbally provide the information.

The no results dialog act may be defined by the author that instructs the resolver to indicate that no results were returned. For example, the author may use a dialog act to select or define a user interface that indicates no results were returned.

The suggestions dialog act may be defined by the author that instructs the resolver to provide the user with one or more suggestions in response to returning no results. For example, an author may use the dialog act to define a prompt such as "Please select a location" and an associated user interface including a list of the suggested locations or a map displaying the suggested locations.

Additional dialog acts that may be included within a resolver, which may be specific to completing an interaction with a user and completing a task, will be discussed below, in reference to the final task identification operation 210.

The identify resolvers operation 206 may also comprise defining a custom resolver, written to the specific needs of the third-party application author, which includes reference to one or more generic resolvers, which may have been written by the platform provider or some other party. The combination of custom resolver with the generic resolver allows the author to use pre-written resolvers for commonly-addressed functions, while also allowing the author to create custom interfaces specific to the needs of the third party. For example, a restaurant reservation system author may use a generic resolver to gather information for when a customer wishes to make a reservation, then pass that information to a custom resolver that may specifically determine whether the customer's stated time meets the requirements for a reservation and if that reservation time is available. In this way, the author need not re-write a basic time-gathering resolver and its attendant dialogs, but may customize the resolution and dialogs for a specific reservations system. The definition of resolvers is further illustrated and described with reference to FIG. 3, and the execution of such resolvers is further illustrated and described with reference to FIG. 4.

In the identify validation conditions operation 208, author may define conditions that must be satisfied prior to task completion and what the system should do if one or more of those conditions are breached. In an example, when booking a taxi, a validation condition would ensure that the start and end location may be reachable using only ground transportation. In another example, for an email sending task, a validation condition would ensure that the subject and body of the email are not both empty before sending the email.

In the final task identification operation 210, a final action or task may be defined. In an example, the final task identification operation 210 may prompt the author to provide a name for the final action as well as a listing of each of the required and optional input parameters that need to be provided for task execution. The final task identification operation 210 may further prompt the user to provide the resolver associated with the final action, which was previously defined in the define resolvers 206 operation. The final action resolver is responsible for providing the final piece of information to be displayed to the user, or performing an action on behalf of the user. For example, in the taxi example, the final action resolver is responsible for placing an order for a taxi based on the received information. The final action resolver may further include, in an example, also returning a confirmation code that can be displayed to the user. Within the resolver identified in the final task identification operation 210, the author may define a confirmation dialog act that prompts the user to confirm the task execution prior to task execution. In the taxi example, a confirmation dialog act comprising a prompt such as "Would you like me to book this trip now?" may be defined by the author. Alternatively, in the resolver identified by the final task identification operation 210, the author may define a confirmation failure dialog act that prompts the user to confirm the non-execution of a task. In the taxi example, a confirmation failure dialog act such as, "I will not book this trip. What would you like to change?" may be defined and provided to the user. Yet further, in the resolver identified by the final task identification operation 216, the author may define a completion dialog act that specifies a completion prompt to be displayed or otherwise provided to the user in the event that the task is executed. In the taxi example, a completion prompt such as, "Your taxi has been booked. Your booking ID is <ID>" may be provided to the user.

Accordingly, the method 200 provides a third-party application author with the ability to define one or more tasks that may be executed using the CU system of the device as well as the ability to author one or more dialog acts. In defining the task, the method 200 allows the third-party application author to leverage third-party LU models to extract keywords from a natural language query in fulfilling the necessary and optional parameters associated with the task as well as leverage or extend one or more third-party resolvers used by the CU system to understand the detected keywords in order to complete the task.

Figure 3:
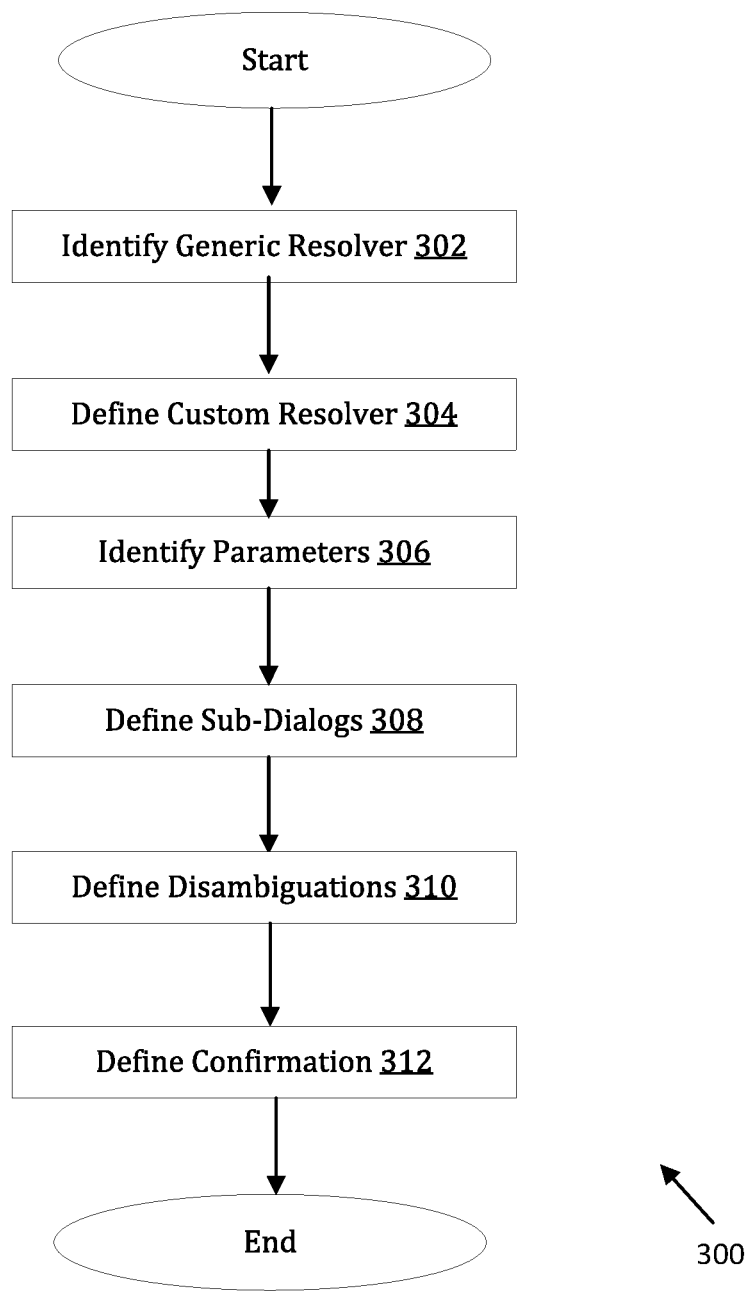
FIG. 3 illustrates an example method for specifying the elements necessary for a resolver chain.

FIG. 3 illustrates an example method 300 for specifying a resolver chain. As described herein, a third-party application designer may, among other actions, specify one or more custom resolvers, generic resolvers, and relevant dialogs to resolve the speech subunit from the customer into one or more parameters. The method 300 may be performed by one or more devices of a resolver-chaining platform, such as resolver chaining platform 106 of FIG. 1. In alternate aspects, however, the method 300 may be performed by other type of devices, such as a client device with an IDE or resolver chaining application. The method 300 is capable of receiving said information and generating one or more resolver chains in accordance with the received information. Specification of a resolver chain includes identifying sub-dialogs to gather the parameters associated with the resolver chain, identifying methods to disambiguate user responses, identifying methods to confirm the value of parameters, and combining the one or more generic resolvers with one or more custom resolvers. In the taxi ordering task example, a resolver chain may include a generic resolver for determining a time and a custom resolver for responding to the customer with available times based on the taxi company's current schedule. The resolver chain may also include disambiguation methods for determining whether the customer asking for a taxi at 6:00 means early evening or early morning. Furthermore, the resolver chain may include a method for confirming exactly what time the customer wishes his or her taxi to arrive.

In the identify generic resolver operation 302, the generic and custom resolver chaining platform 106 prompts the author to specify a generic resolver to begin resolution of a given parameter. The generic resolver may be provided by a resolver chaining platform, an application developer, a third-party developer, etc., and may relate to one or more broad categories of parameters. For example, the platform provider may offer generic resolvers related to parameters such as location, time, numbers, persons, or music. While specific categories of generic resolvers have been described herein, one of skill in the art will appreciate that other types or categories of generic resolvers may be employed by the systems and method disclosed herein without departing from the spirit of this disclosure. As such, various systems and method disclosed herein may provide more refined versions of these generic resolvers. For example, in addition to a general "location" resolver, the platform may also offer generic resolvers specific to restaurants, theaters, homes, stores, addresses, parks, monuments, schools, daycares, libraries, offices, government buildings, cross-streets, or other places of interest. In the example of a restaurant reservation system, the author may choose both a location generic resolver and a restaurant-location generic resolver. As an additional example, in addition to a general "person" resolver, the platform may offer generic resolvers specific to an artist, a singer, an actor, a CEO, an executive, a celebrity, an athlete, or other specific category of person.

It should be noted that the resolver-chaining platform may receive multiple generic resolvers, such that one may be chained to another before reaching the custom resolver. In this way, the generic resolvers may provide further specification without the need for the author to do so. For example, a generic resolver for location may relate to an address, while a generic resolver for a restaurant may chain from the first generic resolver and contain information specific to a restaurant, such as hour of operation and type of food. As will be described in further detail, a custom resolver may be received that can be chained to the generic resolver(s). Continuing with the restaurant example, a custom resolver for "Andy's Mexican Restaurant" that will chain to those generic resolvers and contain additional information specific to that restaurant.

In the define custom resolver operation 304, the generic and custom resolver chaining platform 106 may prompt the author to define or provide a custom resolver to chain with the one or more chosen generic resolvers. The custom resolver may be specified for a specific task or application and may comprise any dialogs and/or disambiguations not already provided by the generic resolvers.

The generic and custom resolvers may be chained together via linking input parameters of one resolver to the output parameters of a previous resolver within one or more files. This resolver chain may contain the information necessary for the platform to resolve a user's input into the parameters necessary for a given task.

The generic and custom resolver chain platform 106 may receive information defining the role of the resolver, the description, dialogs related to the parameters, input parameters required, and/or confirmation dialogs.

In the identify parameters operation 306, the generic and custom resolver chaining platform 106 may prompt the author to define what parameters each of the resolvers determines and provides. In response to prompting the author, information about the parameters may be received at operation 306. These parameters, once fulfilled, may be used by another resolver or may be passed to the task. Parameters resolved by a generic resolver and passed to either another generic resolver or custom resolver may be considered intermediate parameters. For example, a reservation system may use a generic resolver to determine what time a customer would like a reservation, and then pass that value to a custom resolver that determines whether the given time is available in a specific restaurant.

In the define sub-dialogs operation, 308, the generic and custom resolver chaining platform 106 prompts the author to identify which sub-dialogs should be used by the custom resolver in what circumstances. Each sub-dialog is intended to prompt the user for additional information that may be missing or ambiguous or to provide information to the user. For example, if the user has not provided a piece of key information, such as a time for a reservation, the custom resolver may contain a link to a dialog to ascertain that time. Standard resolvers may also be available for use by a third party developer to incorporate into the custom resolver.

In the define disambiguations operation, 310, the generic and custom resolver chaining platform 106 may receive one or more disambiguation sub-dialogs for use in the custom resolver. The generic and custom resolver chaining platform will, in the custom resolver, define how the resolver should disambiguate uncertain information. This is accomplished by providing a dialog action for disambiguation. As discussed above, a disambiguation dialog may be defined by the author ask the user to verify a particular value of a parameter in order to resolve ambiguities that may arise because the resolver obtained multiple potential values for a parameter In the define confirmation operation, 312, the generic and custom resolver chaining platform 106 may prompt the author to define, within the resolver, if and how the resolver will confirm the final value with the user. This is accomplished by receiving a dialog action for confirmation. As discussed above, the received dialog action may operate by confirming that the action will take place, by confirming that the action will not take place, and/or by confirming to the user that the action has or has not taken place and providing some form of confirmation identification.

An example code snippet for a combination of a generic time resolver chained to a custom reservation time resolver is shown below:

Time." That parameter is then used by the custom resolver as an input parameter to determine the parameter "MealTimeAvailable," which may be used by a task. The custom resolver contains a sub-dialog for confirming the final value with the user. It should be noted that the snippet above is presented as a mere illustration of a method of implementation, and should not be viewed as limiting.

Figure 4:
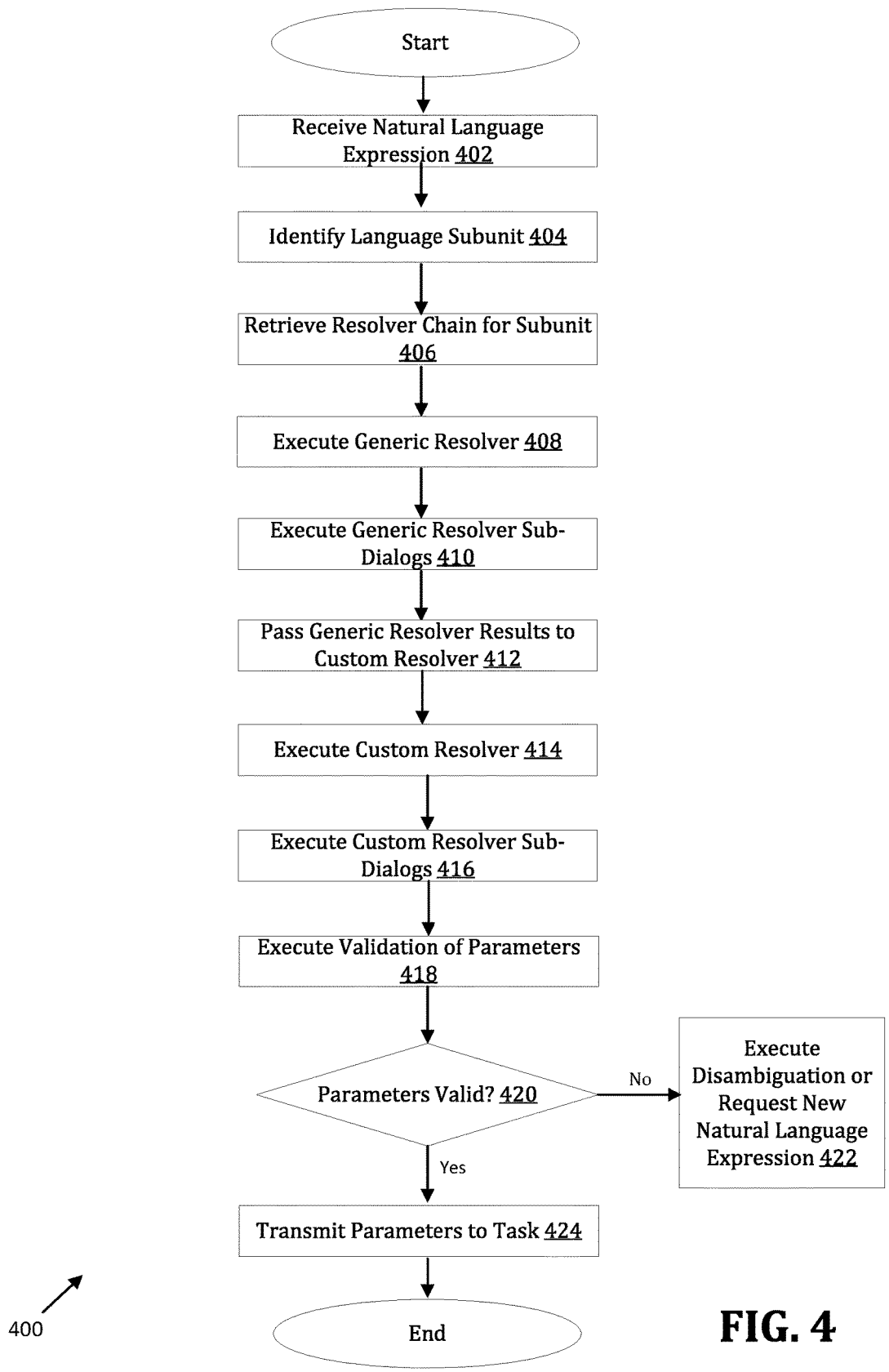
FIG. 4 illustrates an example method for using a resolver chain to determine the parameters for a task.

FIG. 4 illustrates an example method 400 for a remote system to execute a resolver chain on the generic and custom resolver chaining platform 106 or other computer entity hosting the resolvers, such as client device 102. As described herein, a third-party application may, among other actions, receive natural language from a user, identify a subunit to resolve, retrieve the appropriate resolver chain, execute the one or more generic resolvers, including its sub-dialogs, then pass its results to a custom resolver, which may be executed, along with its sub-dialogs, to determine one or more final parameter values, which may be validated and sent to the requesting task. Reference herein will be made to the example resolver code snippet, above.

In the receive natural language expression operation 402, server 104 or other hosting platform, such as a client device 102 receives from a user the natural language input from the

```
{
    "Role": "MealTime",
    "Description": "Requested time",
    "SlotAttribute": [ "time" ],
    "InputSlotTags": [
        "date",
        "time"
    ],
    "Functor": "TimeResolver",
    "BondType": "Cortana.CU.Portable.Timex3Item",
        "UniqueValue": false,
    "DialogActs": {
        "ImplicitConfirmation": "None",
        "MissingValue": "TimeMissingValueDialogAct",
        "ChangeRequested": "TimeChangeRequestedDialogAct"
    }
},
{
    "Role": "MealTimeAvailable",
    "Description": "Reservation time",
    "InputParameters": [
        "RestaurantOnOpenTable",
        "MealTime",
        "NumberOfPeople"
    ],
    "Functor": "MealTimeAvailableResolver",
    "BondType": "Cortana.CU.Portable.Timex3Item",
    "UniqueValue": true,
      "DialogActs": {
        "NoResultsFollowUp": "MealTimeAvailableNoResultsDialogAct",
        "Disambiguation": "MealTimeAvailableGenericDialogAct",
        "Confirmation": {
          "Act": "MealTimeAvailableGenericDialogAct",
          "PolicyHints": {
             "RequiredIf": "MealTimeAvailable.Method=='Suggested'"
          }
        }
    }
}
```

It should be noted that, in the example above, both the generic and custom resolvers contain links to sub-dialogs for ascertaining information. It should also be noted that the generic time resolution results in a set time and does not include disambiguation. In contrast, the custom resolver includes disambiguation logic and dialogs, and determines if a given, specific time slot is available by comparing the requested time to the available times and computing the intersection between the two sets. In the above example, the generic resolver is determines a parameter named "Mealuser. An example of such a natural language expression may be "Can I get reservations for four people at nine o'clock at Andy's Mexican Restaurant?"

In the identify language subunit operation 404, the device performing the method 400 identifies the task of making a dinner reservation and identifies the parameters, such as location, time, number of persons, etc., required to perform the task. It does so by parsing the natural language expression to determine subunits related to each parameter. For each parameter, the server 104 determines the relevant language subunit to resolve. For example, the device performing the method 400 may determine that "at nine o'clock" is the relevant language subunit for the reservation time.

In the retrieve resolver chain for subunit operation 406, the device performing the method 400 retrieves the appropriate resolver chain for the identified language subunit from the list of resolver chains. This retrieval may be based on the attribute, role, or other parameter found in the resolver chain. With regard to the example code snippet, above, the server may determine that the "Requested time" resolver chain is appropriate, based on it being related to the "time" slot attribute. The system may retrieve the "Requested Time" resolver chain from storage or memory. Retrieving the resolver chain may comprise retrieving the resolver chain from a local store or memory or sending a request for the resolver chain to a remote device.

In the execute generic resolver operation 408, the device performing the method 400 executes the generic resolver portion of the resolver chain. The generic resolver may be designed to resolve a more general type of information and may later pass its resolved value to the custom resolver for resolution specific to the given application. For example, with regard to the code snippet, above, the server may execute the "Requested time" generic resolver to determine what time the user stated. Continuing the example above, the generic resolver would determine that the value was 9:00 and might infer that the user meant the present day. It would then pass that value to the custom resolver for further processing specific to the custom resolver's needs.

In the execute generic resolver sub-dialogs operation 410, the device performing the method 400 determines whether any sub-dialogs related to the generic resolver need to be executed and, if so, executes them. Sub-dialogs may be used to gather missing information, clarify ambiguous information, or other tasks related to clarifying the user's intent. For example, with regard to the code snippet, above, the generic resolver "Requested time" lists a sub-dialog for missing values. This missing value dialog may be used to prompt the user for a time if none was found in the original request.

In the pass generic resolver results to custom resolver operation 412, the generic resolver may determine the generic result and passes it to the custom resolver for more customized processing. This output parameter from the generic resolver may match the required input parameter of the custom resolver. For example, with reference to the code snippet, above, the generic resolver "Requested Time" lists its role as "MealTime" and will pass the "MealTime" parameter to the custom resolver, which lists the parameter as one of its "InputParameters."

In the execute custom resolver operation 414, the device performing the method 400 may receive one or more parameters from the generic resolver, may receive one or more parameters from other resolvers within the task, and processes the input. For example, with reference to the code snippet above, the custom resolver "Reservation time" receives input from the generic resolver "Requested time" and resolves that input, along with other parameters, to determine whether a user may get a reservation at his or her requested time.

In the execute custom resolver sub-dialogs operation 416, the device performing the method 400 determines whether any custom resolver sub-dialogs are necessary and, if so, executes them such that information from the user may be gained or clarified. For example, with reference to the code snippet above, the "Reservation time" custom resolver contains sub-dialogs for "NoResultsFollowUp," "Disambiguation," and "Confirmation." Continuing the example, if a user asked for a nine o'clock reservation, the system may wish to confirm that the user meant 9 pm (as opposed to 9 am) on the present day, if no date was given.

As an alternative embodiment to steps 408-416, above, a resolver chain may also be viewed as a series of resolvers such that each resolver accepts one or more inputs and resolves to one or more parameters, which are then passed to either a task or another resolver. In this way, resolvers are executed in serial fashion until the final parameters for the task are resolved and passed to the task.

As an additional alternative to steps 408-416, the device performing the method 400 may determine, for each set of parameters, whether any appropriate resolver, generic or custom, are appropriate to the parameters and, if so, it may execute that set of resolvers.

In the execute validation of parameters operation 418, the device performing the method 400 uses the validation steps defined for the task to insure that the parameters gathered by the resolver chain meet the requirements given. For example, in a restaurant reservation task, if Andy's Mexican Restaurant is open from 11:00 am to 10:00 pm, the task may wish to validate that a requested time is between those times. Similarly, the system may interface with currently booked reservations to make sure that a table is available during the requested time and, if not, suggest a slightly earlier or later reservation. These validation opens insure that the parameters gathered by the resolver chain will work when passed to the task.

The operation evaluating the results of the validation check may be seen at operation 420. If the results are invalid, control is passed to the execute disambiguation or request new natural language expression step 422. If the results are valid, control passes to the transmit parameters to task operation 424.

The execute disambiguation or request new natural language expression operation 424 occurs if invalid parameters are received by the resolver chain. In this instance, control may revert to an earlier step so that the user is requested to provide new or additional information. Alternatively, the operation may be canceled and the user is alerted that the system was unable to process his or her request.

Finally, in the transmit parameters to task operation 424, the resolver chain transmits the resolved parameters to the task at server 104. When received by the server, these parameters may be used by additional resolvers, resolver chains, or by the final task. In the reservation example discussed above, the requested and validated reservation time may be passed to the task so it may be combined with data from a number resolver chain (for persons in the party) and a location resolver chain (for a specific location of Andy's Mexican Restaurant, such as the Tacoma location) to generate a reservation for the specific user operating the application.

Figure 5:
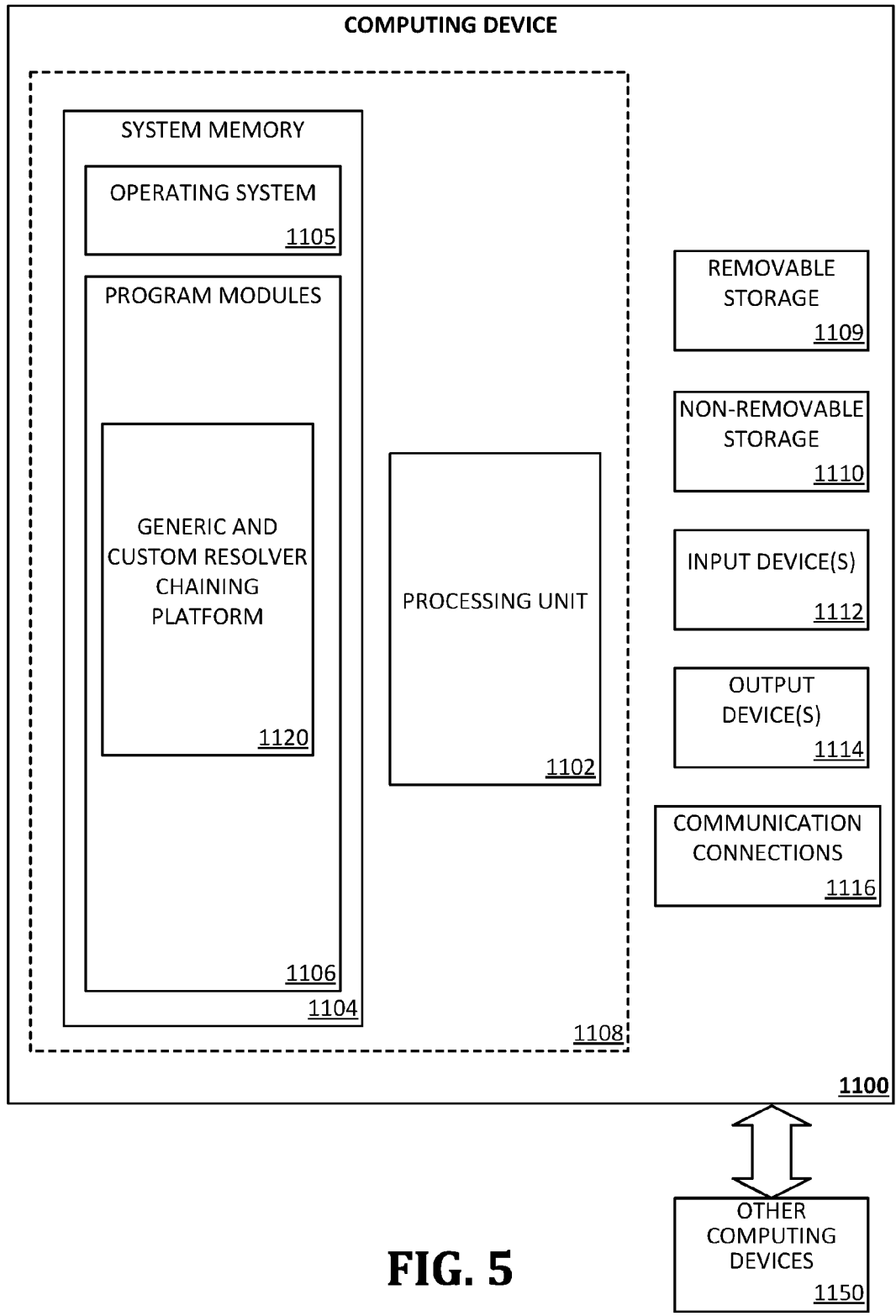
FIG. 5 is a block diagram illustrating example physical components of a computing device with which aspects of the disclosure may be practiced.
Figure 6A:
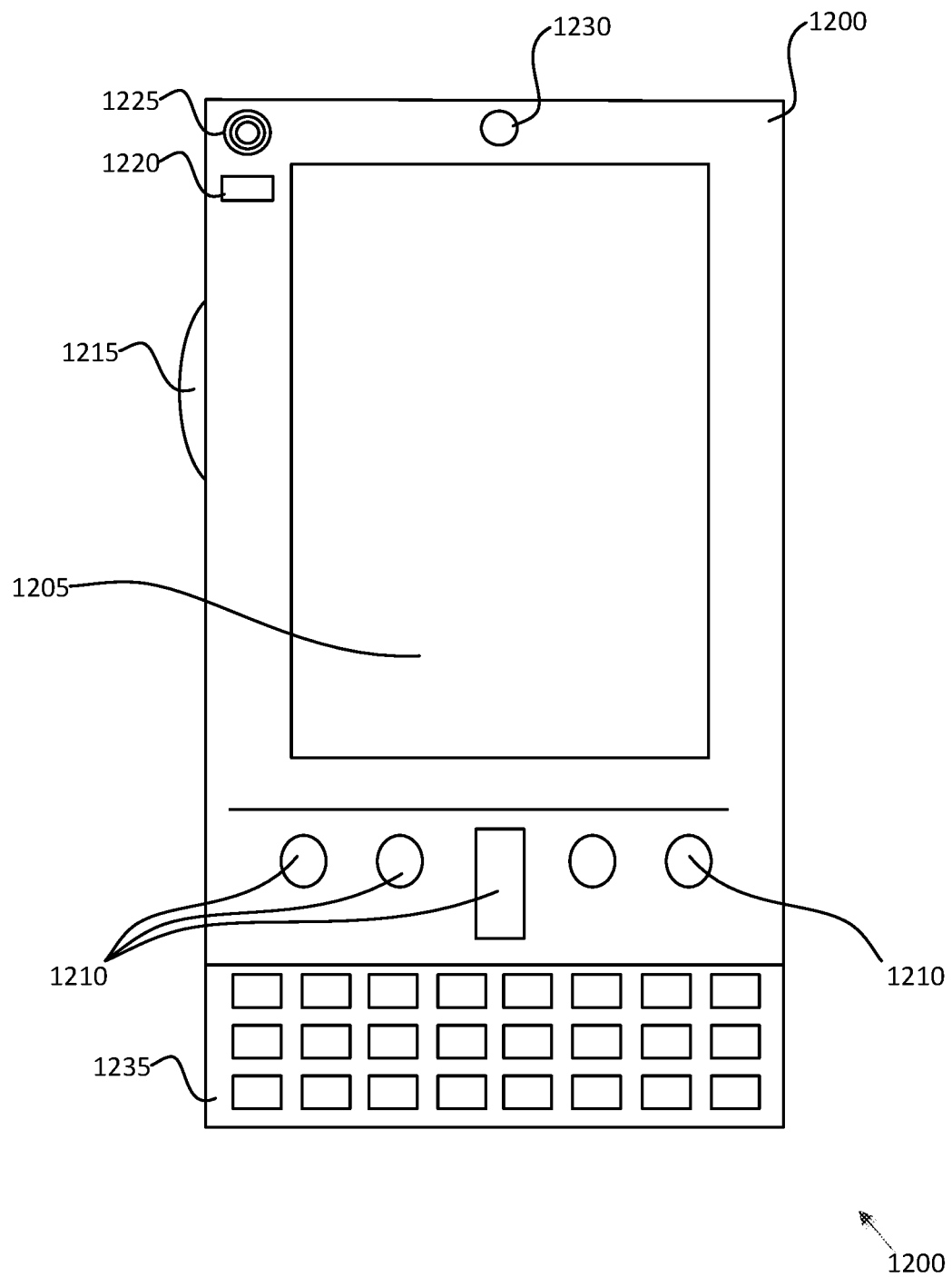
FIG. 6A and FIG. 6B are simplified block diagrams of a mobile computing device with which aspects of the present disclosure may be practiced.
Figure 6B:
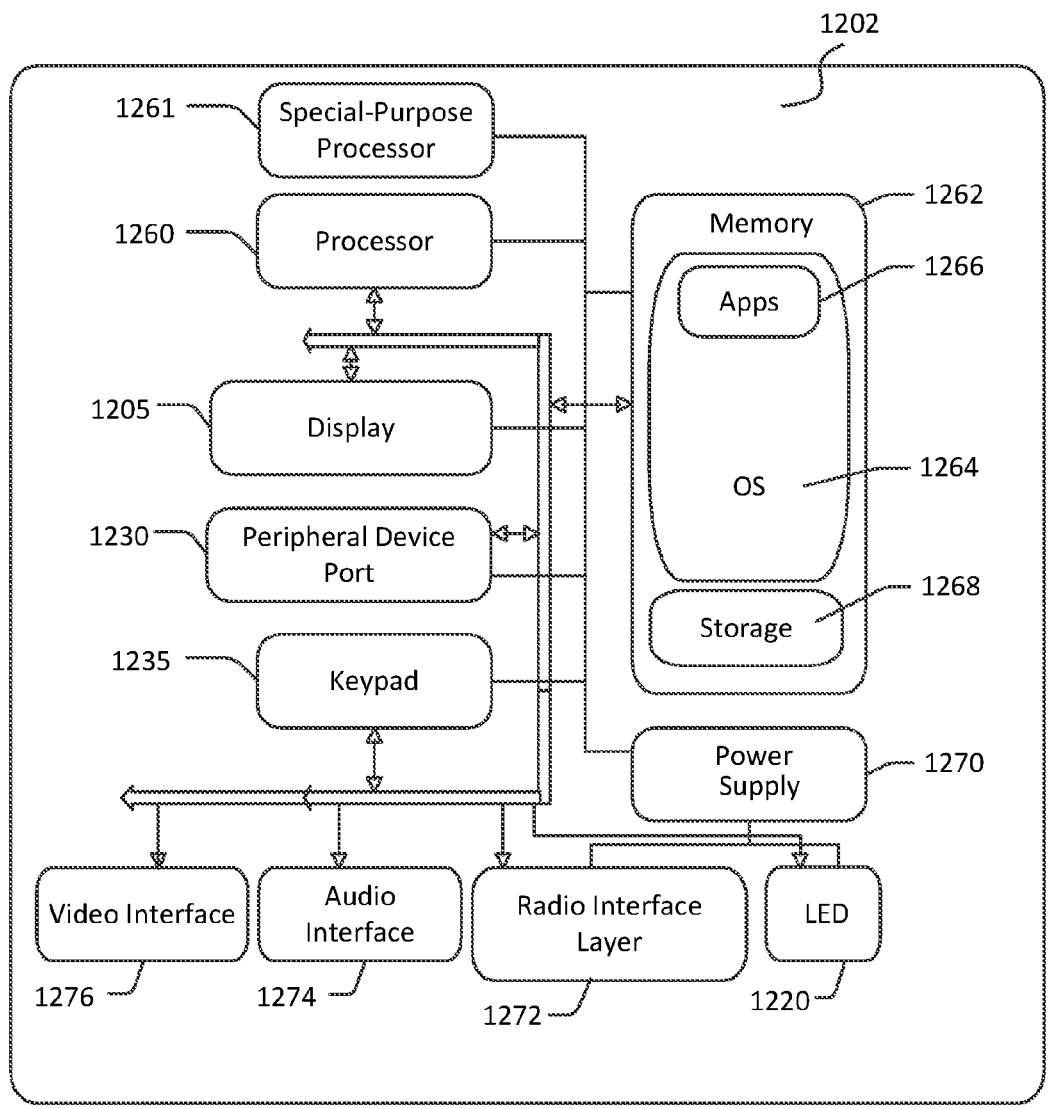
Figure 7:
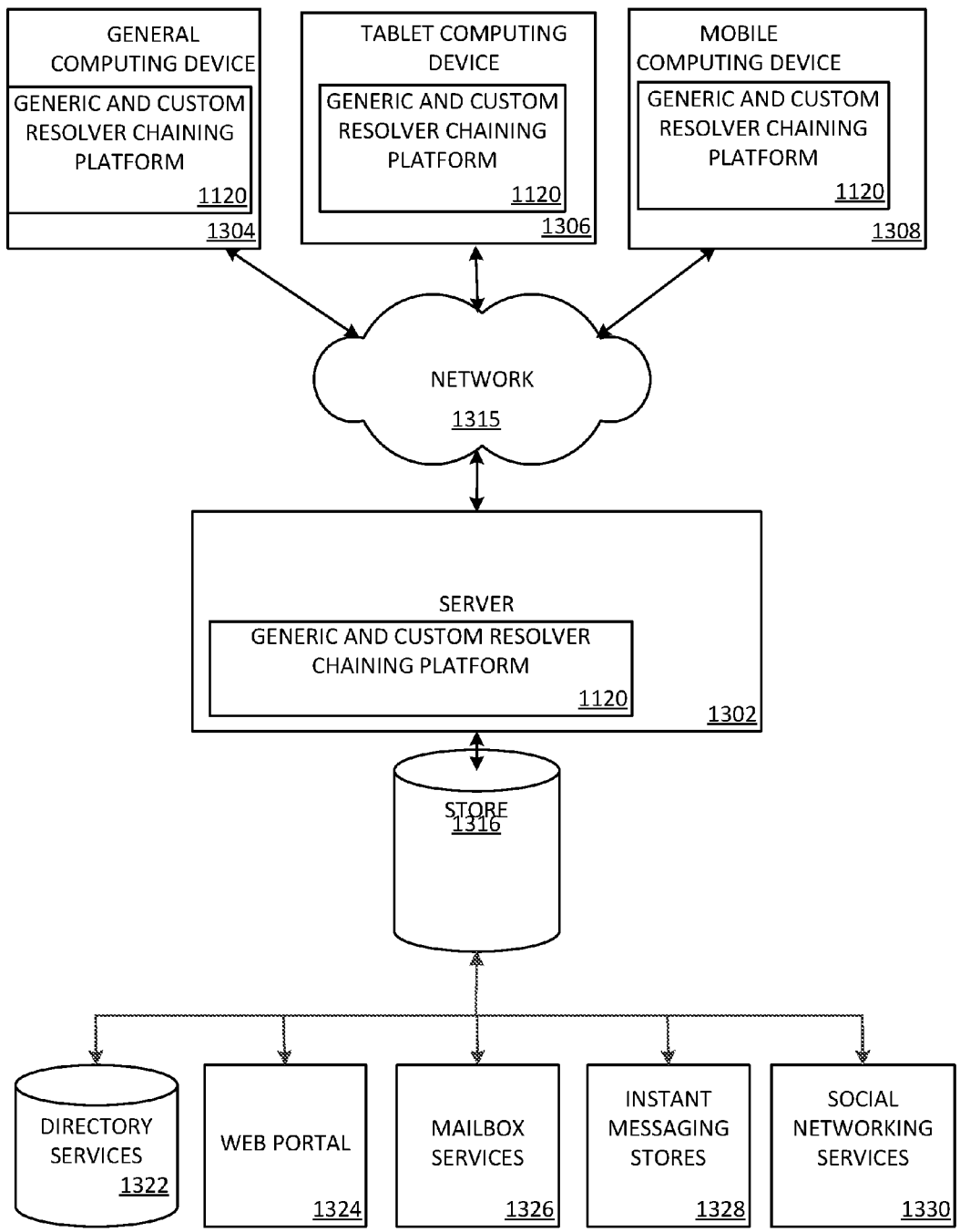
FIG. 7 is a simplified block diagram of a distributed computing system in which aspects of the present disclosure may be practiced.
Figure 8:
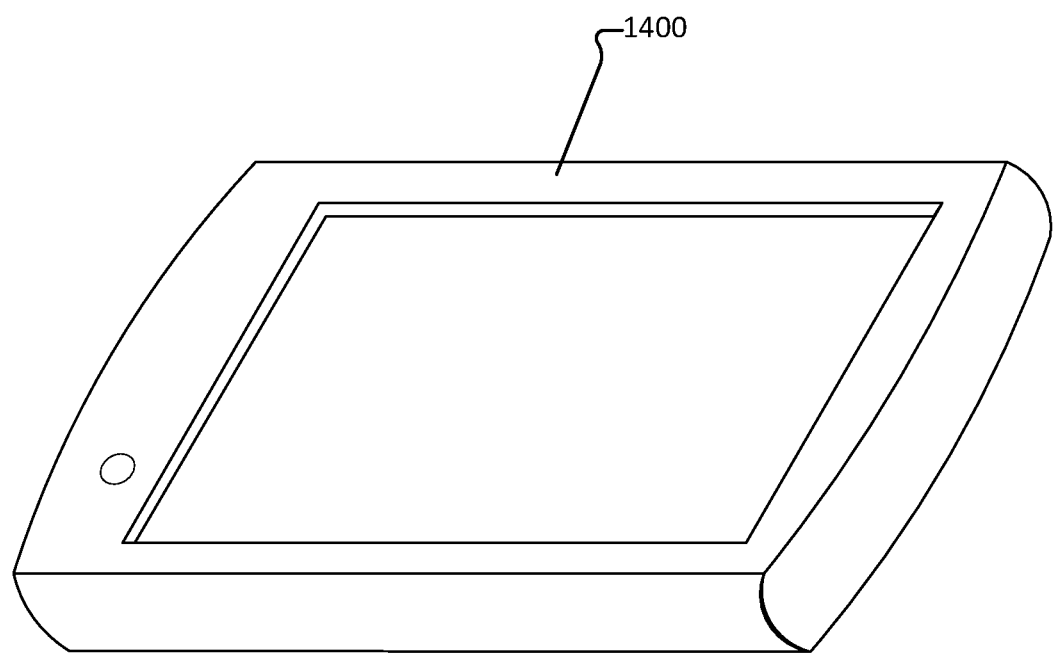
FIG. 8 illustrates a tablet computing device for executing one or more aspects of the present disclosure.

FIG. 5 is a block diagram illustrating physical components (e.g., hardware) of a computing device 1100 with which aspects of the disclosure may be practiced. The computing device components described below may have computer executable instructions for implementing a generic and custom resolver chaining platform 1120 on a computing device including computer executable instructions for the generic and custom resolver chaining platform 1120 that can be executed to employ the methods disclosed herein. In a basic configuration, the computing device 1100 may include at least one processing unit 1102 and a system memory 1104. Depending on the configuration and type of computing device, the system memory 1104 may comprise, but is not limited to, volatile storage (e.g., random access memory), non-volatile storage (e.g., read-only memory), flash memory, or any combination of such memories. The system memory 1104 may include an operating system 1105 suitable for running the generic and custom resolver chaining platform 1120 or one or more components in regards to FIG. 1. The operating system 1105, for example, may be suitable for controlling the operation of the computing device 1100. Furthermore, embodiments of the disclosure may be practiced in conjunction with a graphics library, other operating systems, or any other application program and is not limited to any particular application or system. This basic configuration is illustrated in FIG. 11 by those components within a dashed line 1108. The computing device 1100 may have additional features or functionality. For example, the computing device 1100 may also include additional data storage devices (removable and/or non-removable) such as, for example, magnetic disks, optical disks, or tape. Such additional storage is illustrated in FIG. 11 by a removable storage device 1109 and a non-removable storage device 1110.

As stated above, a number of program modules and data files may be stored in the system memory 1104. While executing on the processing unit 1102, the program modules 1106 (e.g., generic and custom resolver chaining platform 1120) may perform processes including, but not limited to, the aspects, as described herein. Other program modules may be used in accordance with aspects of the present disclosure, and in particular for providing a generic and custom resolver chaining platform.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 11 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1100 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 1100 may also have one or more input device(s) 1112 such as a keyboard, a mouse, a pen, a sound or voice input device, a touch or swipe input device, etc. The output device(s) 1114 such as a display, speakers, a printer, etc. may also be included. The aforementioned devices are examples and others may be used. The computing device 1100 may include one or more communication connections 1116 allowing communications with other computing devices 1150. Examples of suitable communication connections 1116 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1104, the removable storage device 1109, and the non-removable storage device 1110 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1100. Any such computer storage media may be part of the computing device 1100. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIG. 12A and FIG. 12B illustrate a mobile computing device 1200, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 12A, one aspect of a mobile computing device 1200 for implementing the aspects is illustrated. In a basic configuration, the mobile computing device 1200 is a handheld computer having both input elements and output elements. The mobile computing device 1200 typically includes a display 1205 and one or more input buttons 1210 that allow the user to enter information into the mobile computing device 1200. The display 1205 of the mobile computing device 1200 may also function as an input device (e.g., a touch screen display). If included, an optional side input element 1215 allows further user input. The side input element 1215 may be a rotary switch, a button, or any other type of manual input element. In alternative aspects, mobile computing device 1200 may incorporate more or less input elements. For example, the display 1205 may not be a touch screen in some embodiments. In yet another alternative embodiment, the mobile computing device 1200 is a portable phone system, such as a cellular phone. The mobile computing device 1200 may also include an optional keypad 1235. Optional keypad 1235 may be a physical keypad or a "soft" keypad generated on the touch screen display. In various embodiments, the output elements include the display 1205 for showing a graphical user interface (GUI), a visual indicator 1220 (e.g., a light emitting diode), and/or an audio transducer 1225 (e.g., a speaker). In some aspects, the mobile computing device 1200 incorporates a vibration transducer for providing the user with tactile feedback. In yet another aspect, the mobile computing device 1200 incorporates input and/or output ports, such as an audio input (e.g., a microphone jack), an audio output (e.g., a headphone jack), and a video output (e.g., a HDMI port) for sending signals to or receiving signals from an external device.

FIG. 12B is a block diagram illustrating the architecture of one aspect of a mobile computing device. That is, the mobile computing device 1200 can incorporate a system (e.g., an architecture) 1202 to implement some aspects. In one embodiment, the system 1202 is implemented as a "smart phone" capable of running one or more applications (e.g., browser, e-mail, calendaring, contact managers, messaging clients, games, and media clients/players). In some aspects, the system 1202 is integrated as a computing device, such as an integrated personal digital assistant (PDA) and wireless phone.

One or more application programs 1266 may be loaded into the memory 1262 and run on or in association with the operating system 1264. Examples of the application programs include phone dialer programs, e-mail programs, personal information management (PIM) programs, word processing programs, spreadsheet programs, Internet browser programs, messaging programs, and so forth. The system 1202 also includes a non-volatile storage area 1268 within the memory 1262. The non-volatile storage area 1268 may be used to store persistent information that should not be lost if the system 1202 is powered down. The application programs 1266 may use and store information in the non-volatile storage area 1268, such as e-mail or other messages used by an e-mail application, and the like. A synchronization application (not shown) also resides on the system 1202 and is programmed to interact with a corresponding synchronization application resident on a host computer to keep the information stored in the non-volatile storage area 1268 synchronized with corresponding information stored at the host computer. As should be appreciated, other applications may be loaded into the memory 1262 and run on the mobile computing device 1200, including the instructions for providing a generic and custom resolver chaining platform as described herein.

The system 1202 has a power supply 1270, which may be implemented as one or more batteries. The power supply 1270 might further include an external power source, such as an AC adapter or a powered docking cradle that supplements or recharges the batteries.

The system 1202 may also include a radio interface layer 1272 that performs the function of transmitting and receiving radio frequency communications. The radio interface layer 1272 facilitates wireless connectivity between the system 1202 and the "outside world," via a communications carrier or service provider. Transmissions to and from the radio interface layer 1272 are conducted under control of the operating system 1264. In other words, communications received by the radio interface layer 1272 may be disseminated to the application programs 1266 via the operating system 1264, and vice versa.

The visual indicator 1220 may be used to provide visual notifications, and/or an audio interface 1274 may be used for producing audible notifications via the audio transducer 1225. In the illustrated embodiment, the visual indicator 1220 is a light emitting diode (LED) and the audio transducer 1225 is a speaker. These devices may be directly coupled to the power supply 1270 so that when activated, they remain on for a duration dictated by the notification mechanism even though the processor 1260 and other components might shut down for conserving battery power. The LED may be programmed to remain on indefinitely until the user takes action to indicate the powered-on status of the device. The audio interface 1274 is used to provide audible signals to and receive audible signals from the user. For example, in addition to being coupled to the audio transducer 1225, the audio interface 1274 may also be coupled to a microphone to receive audible input, such as to facilitate a telephone conversation. In accordance with embodiments of the present disclosure, the microphone may also serve as an audio sensor to facilitate control of notifications, as will be described below. The system 1202 may further include a video interface 1276 that enables an operation of an on-board camera 1230 to record still images, video stream, and the like.

A mobile computing device 1200 implementing the system 1202 may have additional features or functionality. For example, the mobile computing device 1200 may also include additional data storage devices (removable and/or non-removable) such as, magnetic disks, optical disks, or tape. Such additional storage is illustrated in FIG. 12B by the non-volatile storage area 1268.

Data/information generated or captured by the mobile computing device 1200 and stored via the system 1202 may be stored locally on the mobile computing device 1200, as described above, or the data may be stored on any number of storage media that may be accessed by the device via the radio interface layer 1272 or via a wired connection between the mobile computing device 1200 and a separate computing device associated with the mobile computing device 1200, for example, a server computer in a distributed computing network, such as the Internet. As should be appreciated such data/information may be accessed via the mobile computing device 1200 via the radio interface layer 1272 or via a distributed computing network. Similarly, such data/information may be readily transferred between computing devices for storage and use according to well-known data/information transfer and storage means, including electronic mail and collaborative data/information sharing systems.

FIG. 13 illustrates one aspect of the architecture of a system for processing data received at a computing system from a remote source, such as a personal computer 1304, tablet computing device 1306, or mobile computing device 1308, as described above. Content displayed at server device 1302 may be stored in different communication channels or other storage types. For example, various documents may be stored using a directory service 1322, a web portal 1324, a mailbox service 1326, an instant messaging store 1328, or a social networking site 1330. The generic and custom resolver chaining platform 1020 may be employed by a client that communicates with server device 1302, and/or the generic and custom resolver chaining platform 1020 may be employed by server device 1302. The server device 1302 may provide data to and from a client computing device such as a personal computer 1304, a tablet computing device 1306 and/or a mobile computing device 1308 (e.g., a smart phone) through a network 1315. By way of example, the computer system described above with respect to FIGS. 1-10 may be embodied in a personal computer 1304, a tablet computing device 1306 and/or a mobile computing device 1308 (e.g., a smart phone). Any of these embodiments of the computing devices may obtain content from the store 1316, in addition to receiving graphical data usable to be either pre-processed at a graphic-originating system, or post-processed at a receiving computing system.

FIG. 14 illustrates an exemplary tablet computing device 1400 that may execute one or more aspects disclosed herein.

In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

In one aspect, the present disclosure is directed to a system comprising: at least one processor; and memory encoding computer executable instructions that, when executed by the at least one processor, perform a method comprising: receiving a selection of a first generic resolver; receiving a first custom resolver, wherein the first custom resolver defines a set of parameters for a task; chaining the first generic resolver and the first custom resolver into a resolver chain, wherein the resolver chain is operable to extract at least one parameter from a natural language expression related to the task; and storing the resolver chain for future use by a natural language understanding system.

In another aspect, the present disclosure is directed to a method for providing parameters to a task, the method comprising: receiving a selection of at least one generic resolver; receiving a selection of a first custom resolver, wherein the first custom resolver defines a set of parameters for a task; chaining the at least one generic resolver and the first custom resolver into a resolver chain, wherein the resolver chain is operable to extract at least one parameter from a natural language expression related to the task; and storing the resolver chain for future use by a natural language understanding system.

In yet another aspect, the present disclosure is directed to a method for using a resolver chain to extract at least one parameter from a natural language expression related to a task, comprising: receiving from a user a natural language expression related to a task; retrieving at least one resolver chain related to the task, the resolver chain comprising at least one generic resolver and at least one custom resolver; evaluating the natural language expression using the resolver chain, where evaluating the natural language expression comprises: parsing the natural language expression into at least one subunit; applying at least one generic resolver and at least one custom resolver from the resolver chain to extract at least one parameter from the at least one subunit; and passing the at least one parameter to the task Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A system comprising:
   at least one processor; and
   memory encoding computer executable instructions that, when executed by the at least one processor, perform a method comprising:
      receiving a selection of a first generic resolver, wherein the first generic resolver defines a first set of parameters for performing a commonly used function;
      receiving a first custom resolver, wherein the first custom resolver is associated with a specific application and defines a second set of parameters for a task;
      chaining the first generic resolver and the first custom resolver into a resolver chain, wherein the resolver chain is operable to extract at least one parameter from a natural language expression related to the task and pass the at least one parameter from the first generic resolver to the first custom resolver; and
      storing the resolver chain for future use by a natural language understanding system.

2. The system of claim 1, wherein the resolver chain contains a sub-dialog to disambiguate the natural language expression.

3. The system of claim 1, wherein the first generic resolver resolves to a location.

4. The system of claim 3, wherein the location is selected from at least one of the following locations:
   a restaurant;
   a theater;
   a home;
   a school;
   a park;
   a monument;
   a library;
   an office;
   a government building;
   a store;
   an address;
   a place of interest; and a cross-street.

5. The system of claim 1, wherein the first generic resolver resolves to a person.

6. The system of claim 5, wherein the person is selected from at least one of the following persons:
   an artist;
   a singer;
   an actor;
   a CEO;
   an executive;
   a celebrity; and
   an athlete.

7. The system of claim 1, wherein the first custom resolver defines values to validate the at least one extracted parameter.

8. The system of claim 1, wherein receiving the selection of the first generic resolver comprises:
   receiving a selection of the first generic resolver; and
   receiving a selection of a second generic resolver, and wherein chaining the first generic resolver and the first custom resolver into the resolver chain comprises chaining the first generic resolver, the second generic resolver and the first custom resolver.

9. A method for providing parameters to a task, the method comprising:
   receiving a selection of at least one generic resolver, wherein a first generic resolver of the at least one generic resolvers defines a first set of parameters for performing a commonly used function;
   receiving a selection of a first custom resolver, wherein the first custom resolver is associated with a specific application and defines a second set of parameters for a task;
   chaining the at least one generic resolver and the first custom resolver into a resolver chain, wherein the resolver chain is operable to extract at least one parameter from a natural language expression related to the task and pass the at least one parameter from the first generic resolver to the first custom resolver; and
   storing the resolver chain for future use by a natural language understanding system.

10. The method of claim 9, wherein the resolver chain contains a sub-dialog to disambiguate the natural language expression.

11. The method of claim 9, wherein the first generic resolver resolves to a location.

12. The system of claim 11, wherein the location is selected from at least one of the following locations:
   a restaurant;
   a theater;
   a home;
   a school;
   a park;
   a monument;
   a library;
   an office;
   a government building;
   a store;
   an address;
   a place of interest; and
   a cross-street.

13. The method of claim 9, wherein the first generic resolver resolves to a time interval.

14. The method of claim 13, wherein the time interval relates to an availability of a product or service.

15. The method of claim 9, wherein the first custom resolver defines values to validate the at least one extracted parameter.

16. The method of claim 9, wherein receiving the selection of at least one generic resolver comprises:
   receiving a selection of the first generic resolver; and
   receiving a selection of a second generic resolver, and wherein chaining the at least one generic resolver and the first custom resolver into the resolver chain comprises chaining the first generic resolver, the second generic resolver and the first custom resolver.

17. A method for using a resolver chain to extract at least one parameter from a natural language expression related to a task, the method comprising:
   receiving from a user a natural language expression related to a task;
   retrieving at least one resolver chain related to the task, the resolver chain comprising at least one generic resolver and at least one custom resolver; and
   evaluating the natural language expression using the resolver chain, where evaluating the natural language expression comprises:
      parsing the natural language expression into at least one subunit;
      applying at least one generic resolver and at least one custom resolver from the resolver chain to extract at least one parameter from the at least one subunit, wherein the at least one custom resolver is associated with a specific application;
      passing the at least one parameter from the at least one generic resolver to the at least one custom resolver; and
      passing the at least one parameter from the at least one custom resolver to the task.

18. The method of claim 17, wherein the parameter type is at least one of the following parameter types:
   a time parameter;
   a location parameter;
   a people parameter;
   a number parameter; and
   a music parameter.

19. The method of claim 17, wherein the natural language subunit is disambiguated by at least one sub-dialog.

20. The method of claim 17, wherein the parameter is validated via one or more values stored in the custom resolver.

* * * * *